United States Patent
Wen et al.

(10) Patent No.: US 10,264,268 B2
(45) Date of Patent: Apr. 16, 2019

(54) PRE-ENCODING FOR HIGH EFFICIENCY VIDEO CODING

(71) Applicant: Shenzhen Boyan Technology Ltd., Shenzhen (CN)

(72) Inventors: Jiangtao Wen, Walnut, CA (US); Meiyuan Fang, Beijing (CN); Minhao Tang, Beijing (CN); Spencer Cheng, Ontario (CA)

(73) Assignee: SHENZHEN BOYAN TECHNOLOGY LTD., Shenzhen (CN)

( * ) Notice: Subject to any disclaimer, the term of this patent is extended or adjusted under 35 U.S.C. 154(b) by 480 days.

(21) Appl. No.: 15/093,409

(22) Filed: Apr. 7, 2016

(65) Prior Publication Data

US 2016/0301931 A1 Oct. 13, 2016

Related U.S. Application Data (60) Provisional application No. 62/144,133, filed on Apr. 7, 2015.

(51) Int. Cl.

| H04N 19/126 | (2014.01) |
|---|---|
| H04N 19/149 | (2014.01) |
| H04N 19/147 | (2014.01) |
| H04N 19/15 | (2014.01) |
| H04N 19/124 | (2014.01) |
| H04N 19/174 | (2014.01) |
| H04N 19/192 | (2014.01) |
| H04N 19/87 | (2014.01) |
| H04N 19/40 | (2014.01) |

(52) U.S. Cl.
CPC ......... *H04N 19/149* (2014.11); *H04N 19/124* (2014.11); *H04N 19/147* (2014.11); *H04N 19/15* (2014.11); *H04N 19/174* (2014.11); *H04N 19/192* (2014.11); *H04N 19/40* (2014.11); *H04N 19/87* (2014.11)

(58) Field of Classification Search
CPC .... H04N 19/149; H04N 19/124; H04N 19/15; H04N 19/147; H04N 19/192; H04N 19/40

See application file for complete search history.

(56) References Cited

U.S. PATENT DOCUMENTS

| 2015/0172662 A1* | 6/2015 | Pearson | H04N 19/124 375/240.03 |
| 2015/0189306 A1* | 7/2015 | Li | H04N 19/136 375/240.16 |
| 2016/0007050 A1* | 1/2016 | Rusert | H04N 19/56 375/240.08 |
| 2016/0088298 A1* | 3/2016 | Zhang | H04N 19/146 375/240.03 |

* cited by examiner

*Primary Examiner* — Obafemi O Sosanya
(74) *Attorney, Agent, or Firm* — Gokalp Bayramoglu (57) ABSTRACT

An HEVC encoder is described that utilizes pre-compression, or pre-encoding, to improve the rate control at a relatively small increase in computational complexity.

17 Claims, 7 Drawing Sheets

PRE-ENCODING FOR HIGH EFFICIENCY VIDEO CODING

CROSS-REFERENCE TO RELATED APPLICATIONS

The current application claims priority to U.S. Provisional Ser. No. 62/144,133 filed Apr. 7, 2015, which is expressly incorporated herein in its entirety by reference, and thus forms part of the present specification.

STATEMENT RE: FEDERALLY SPONSORED RESEARCH/DEVELOPMENT

Not Applicable.

BACKGROUND

The current disclosure relates to video encoding, and in particular to high efficiency video coding (HEVC).

HEVC is the latest video compression standard from the ITU and MPEG as the successor to H.264/AVC, which is currently one of the most widely adopted video coding standards. On average, HEVC can save 50% of the bits as compared to H.264/AVC for the same visual quality but at a much higher encoding complexity.

For HEVC to be deployed to meet this challenge high quality video content distribution, various tools and algorithms need to be developed. These include efficient mode decision, motion estimation algorithms and rate control algorithms that support various requirements for real-world applications. For rate control, a R-$\lambda$ model based algorithm has been adopted in the HEVC reference software.

BRIEF SUMMARY

In accordance with the present disclosure there is provided an encoder for HEVC encoding comprising: a processing unit for executing instructions; and a memory unit for storing instructions, which when executed by the processing unit configure the encoder to: estimate an initial encoding parameter value for at least a portion of a frame being encoded, the initial encoding parameter value being one of $\lambda$ and quantization parameter (QP); adjust the initial encoding parameter value by fast-encoding the portion of the frame using a reduced subset of possible encoding modes; and encode the portion of the frame using the adjusted encoding parameter value and a larger set of possible encoding modes then in the reduced subset.

In a further embodiment of the encoder, the reduced subset of possible encoding modes use a coding unit (CU) size of 32×32 or 16×16.

In a further embodiment of the encoder, the reduced subset of possible encoding modes use the CU size of 32×32.

In a further embodiment of the encoder, wherein the fast-encoding is associated with a rate value ($R_{pre}$) and a distortion value ($D_{pre}$), where the encoding is associated with a rate value ($R_{full}$) and a distortion value of ($D_{full}$) with: $R_{full}=k_R R_{pre}$; and $D_{full}=k_D D_{pre}$, $k_R$ and $k_D$ are respective constants.

In a further embodiment of the encoder, $k_R=0.93$; and $k_D=0.93$.

In a further embodiment of the encoder, the HEVC encoding is a constant bit rate (CBR) HEVC encoding.

In a further embodiment of the encoder, the initial encoding parameter is $\lambda$ and is estimated using an R-$\lambda$ model and is adjusted based on repeated fast-encodings according to: $\lambda=\sqrt{\lambda_{low} \times \lambda_{high}}$, where: $\lambda_{low}$ is a $\lambda$ value determined from the fast-encodings that causes a bitrate under-shoot; and $\lambda_{high}$ is a $\lambda$ value determined from the fast-encodings that causes a bitrate over-shoot.

In a further embodiment of the encoder, herein the fast-encodings determine the $\lambda$ value according to: $\lambda=k_1 \alpha R^{\beta}+k_2 ae^{bR}$, where: $k_1=10\times$bits per pixel (bpp); and $k_2=1-(k_1$ clipped to $[0.0,1.0])$.

In a further embodiment of the encoder, herein the HEVC encoding is a delta-QP (DQP) HEVC encoding.

In a further embodiment of the encoder, the initial encoding parameter is QP, and the fast-encoding uses only 32×32 modes or only 16×16 modes.

In a further embodiment of the encoder, the HEVC encoding is a constant quality (QP) HEVC encoding.

In a further embodiment of the encoder, the initial encoding parameter is QP, wherein the initial QP value is adjusted by repeated fast-encodings based on a peak signal to noise ratio (PSNR) error.

In a further embodiment of the encoder, the fast-encoding is used to determine a rate value ($R_{pre}$), and the instructions, when executed by the processing unit further configure the encoder to: detect a scene cut when: $R_{pre} > C \times R_{target}$, where: C is a constant; and $R_{target}$ is a target bit rate for the fast encoding.

In a further embodiment of the encoder, C is selected to be between 5 and 8.

In a further embodiment of the encoder, the results of the fast encoding are used in the encoding when the coding unit (CU) sizes of the fast encoding and the encoding match.

In a further embodiment of the encoder, the portion of the frame being encoded is a largest coding unit (LCU) of the frame.

In accordance with the present disclosure there is provided a method for HEVC encoding comprising: estimating an initial encoding parameter value for at least a portion of a frame being encoded, the initial encoding parameter value being one of $\lambda$ and quantization parameter (QP); adjusting the initial encoding parameter value by fast-encoding the portion of the frame using a reduced subset of possible encoding modes; and encoding the portion of the frame using the adjusted encoding parameter value and a larger set of possible encoding modes then in the reduced subset.

In a further embodiment of the method, the HEVC encoding is a constant bit rate (CBR) HEVC encoding, and wherein the initial encoding parameter is $\lambda$ and is estimated using an R-$\lambda$ model and is adjusted based on repeated fast-encodings according to: $\lambda=\sqrt{\lambda_{low} \times \lambda_{high}}$, where: $\lambda_{low}$ is a $\lambda$ value determined from the fast-encodings that causes a bitrate under-shoot; and $\lambda_{high}$ is a $\lambda$ value determined from the fast-encodings that causes a bitrate over-shoot.

In a further embodiment of the method, the reduced subset of possible encoding modes use the CU size of 32×32.

In a further embodiment of the method, the portion of the frame being encoded is a largest coding unit (LCU) of the frame.

BRIEF DESCRIPTION OF THE DRAWINGS

Embodiments are described herein with references to the appended drawings, in which.

DETAILED DESCRIPTION

The HEVC encoder described further herein uses pre-encoding of frames based on a reduced set of encoding modes, and in particular to encoding modes with a single size of coding units. The pre-encoding is used to provide improved bit rate control for variable bit rate encoding, constant bit rate encoding as well as constant quality encoding. The encoding described herein provides an improved single-pass encoding frame-work by adding a new low complexity pre-encoding, also referred to as pre-compression, process to the standard HEVC encoding. The pre-encoding process is a highly simplified form of the full encoding process and can accurately estimate the output of the full encoding at a cost of a relatively small increase in overall encoding complexity.

At a high level, rate control algorithms consist of two steps. The first step is to allocate a target bitrate budget over a group of pictures (GOPs), individual pictures or frames and Coding Units (CUs) in a video sequence. Restrictions such as the buffer occupancy and maximum bitrate may be taken into consideration at this bitrate allocation step. After bitrate allocation, in a second step, a quantization parameter (QP) is selected for the CUs or pictures or CUs to meet the target bitrate allocation. The choice of the QP in turn will have an impact on the rate distortion (RD) optimized encoding process. As the relationship between QP and the pictures after compression is not deterministic, a model needs to be constructed considering various factors such as the type of the pictures (e.g. I or P), the content in the picture and sequence (e.g. motion level, texture, and etc.) and the target bitrate. In general, the more important a frame, or CU, is the more bits that will be allocated for its encoding. Hierarchically allocating bits to every picture can bring significant quality improvement. For coding tree unit (CTU)-level bit allocation, an SATD-based CTU-level weight-based allocation scheme with a bitrate occupancy based feedback has been proposed. Another CTU level rate control scheme for HEVC dynamically adjusts the QP of the CTUs based on a Laplace distribution model of the residuals after transformation.

The two extreme cases of bitrate allocation are CBR and CQ, aimed at uniform bits distribution and visual quality respectively. CBR rate control is essential for video delivery in fixed bandwidth cases such as digital video broadcasting (DVB) or satellite content delivery. Buffer is introduced in the decoder to cope with the potential bitrate fluctuations, which in turn will introduce buffer filling delay such as start-up delay and channel-switch delay. The more stringent the CBR requirement the rate control achieves, the lower the delay can be, which will greatly improve the user experience.

In contrast, Internet based video delivery often does not require CBR rate control. A well-designed VBR rate control algorithm can optimally allocate the target bitrate in accordance to the variations in video complexity over time for better visual quality overall. To facilitate VBR rate control, a constant rate factor (CRF) was introduced in the open source x265 implementation of the HEVC standard, whereas a QP offset profile is used in the HM standard reference software.

An alternative to selecting a QP to accurately achieve the allocated target bitrate in the second step of rate control, for HEVC, is to set the λ parameter in a rate—RD optimization (RDO) of the encoding process. λ is the Lagrangian multiplier in the rate constrained distortion optimization, defined as:

$$J=D+\lambda \cdot R \quad (1)$$

The value of the λ controls the weights of the rate and the distortion in the RD tradeoff. Given the same QP, different λ values will lead to different optimal values of R given the same D (determined by the QP), thereby controlling the resultant bitrate.

Although various algorithms have been proposed for HEVC rate control, including the algorithm for the standard HM reference software, many of these algorithms can still, in many cases, fail to either optimally allocate the overall target bitrate or achieve an accurate setting of QP or λ. To address this problem, a feedback loop has previously been added to the rate control process to "make up" for the loss of rate control accuracy or quality in subsequently encoded portions of the frame/sequence.

An HEVC encoding framework is described herein that incorporates a pre-encoding process. Experiments by implementing the proposed scheme into the latest HEVC reference software HM-16.0 show significant improvement in quality and bitrate control accuracy with a very small increase in encoding complexity. The pre-encoding, or pre-compression, may be applied at the slice level and is a highly simplified form of HEVC compliant encoding. The simplified pre-encoding may be used to analyze the characteristics of the current frame. These characteristics include CTU-level complexity distribution, as well as the number of bits produced after the pre-encoding as well as the distortion of the pre-encoding. The pre-encoding characteristics and results may be used in the full encoding or full compression process to refine the encoding decisions to arrive at an improved quality as well as more optimized bitrate allocation and enforcement.

To improve handling of cases involving scene changes, the pre-encoding framework also incorporates a scene-change detection algorithm so as to prevent model failures. The pre-encoding process may also makes it easier to support the CBR and CQ modes of rate control, as well as advanced encoding algorithms such as fast delta-QP selection with very small additional computational cost.

In HEVC encoding, QP and λ are two important parameters that may directly determine the output bitrate. Between the two, QP is a discrete value between 0 and 51, while λ can be any number in [0.1, 10000.0]. To achieve RD optimized video encoding, the settings of the two parameters need to be coordinated. QP and λ obeying the following logarithmic relation will statistically achieve the best encoding efficiency:

$$QP=c_1 \ln \lambda + c_2 \quad (2)$$

Therefore, in the constant QP mode of the HM-16.0 rate control, as in many other HEVC encoders, λ can be calculated by:

$$\lambda = QPFactor \cdot 2^{(QP-12)/3.0}, \quad (3)$$

where QPFactor is a pre-set parameter that is a one-to-one mapping with the QP. In the λ-domain rate control algorithm of HM on the other hand, QP is calculated using:

$$QP = \lfloor 4.2005 \ln \lambda + 13.7122 + 0.5 \rfloor \quad (4)$$

where $\lfloor \cdot \rfloor$ is the "floor" operation.

In rate control algorithms, before the above formulas can be applied, one of the QP-λ pair must first be determined based on the target bitrate, using models such as the Q-domain R-Q model, the ρ-domain R-Q model or the R-λ model. The R-λ model is used further herein.

Q-domain rate control algorithms may be based on the relationship between rate (R) and quantization (Q). It's assumed that Q, as a function of QP, has a linear correspondence to the content complexity and can accurately estimate the number of bits consumed. The most widely adopted relationship is a quadratic model described by:

$$R = aQ^{-1} + bQ^{-2}, \quad (5)$$

$$QP = 12.0 + 6.0 \times \log\left(\frac{Q}{0.85}\right) \quad (6)$$

where a and b are two parameters related to the video content. To find the best parameters, a brute-force trellis searching method has been used for quantization selection, and achieved on average 17% bitrate reduction with extremely high coding complexity. A greedy single-candidate A* pruning strategy based search has been used previously to achieve different tradeoffs between performance and computational complexity. Although the encoding complexity could be reduced to be practically feasible using the A* pruning strategy, the improvement of coding efficiency also decreased to less than 10%.

To overcome the challenge posed by the inter-dependency between RDO and rate control in H.264/AVC, a two-stage scheme has previously been used, in which once the QP is decided, only a fast re-quantization process is carried out without the high complexity RD optimized mode decision (MD). This two-stage scheme led to about 0.2 dB loss in PSNR on average. A further partial two-pass rate control algorithm in which the current frame is pre-compressed with two different QPs to estimate an appropriate rate control parameters. The process may also take the number header bits into consideration when estimating and updating the model for improving the performance in low bitrate cases.

Another class of rate control algorithms, named ρ-domain rate control, are based on the relationship between the percentage of zeros among the quantized transform coefficients ρ and the coding bitrate R. The ρ-domain model is an extended form of the R-Q model, as it assumes that there exists a one-to-one correspondence between ρ and Q. The relationship between R and ρ is a linear model described by:

$$R = \theta \cdot (1 - \rho), \quad (7)$$

where θ is a parameter determined by the video content. A logarithmic linear model between the QP and ρ, may improve, for example up to 0.6 dB in PSNR, the video quality as compared to other Q-based QP selection algorithms.

Due to the high complexity of HEVC encoding and the close dependency between the quantization and the RD optimized encoding process, the R-Q model faces more challenges when applied to HEVC rate control, as compared with H.264/AVC.

To eliminate the "chicken-and-egg" problem caused by the inter-dependency between QP and RD optimization, the λ-domain control algorithm was first introduced for JPEG. The λ value was adapted based on the mean of absolute differences (MADs) for coding efficiency improvement. A λ-domain model has previously been used to directly estimate λ. In the previous λ-domain model, R is a function of λ based not on the residual data of the current frame to be encoded, but information from frames that have already been encoded, without any intermediate assumptions based on the hyperbolic R-D model:

$$D(R) = CR^{-K} \quad (8)$$

$$\lambda = abpp^{\beta} \quad (9)$$

$$bpp = \frac{R}{\text{Framerate} \cdot \text{Width} \cdot \text{Height}} \quad (10)$$

Where $\{C, K, \alpha, \beta\}$ are content dependent parameters, and bpp is the average number of allocated bits per pixel, calculated from the target bitrate. The parameters $\{\alpha, \beta\}$ are updated after compressing each frame according to:

$$\lambda_{comp} = \alpha_{old} bpp_{real}^{\beta_{old}}, \quad (11)$$

$$\alpha_{new} = \alpha_{old} + \delta_{\alpha} \times (\ln \lambda_{real} - \ln \lambda_{comp}) \times \alpha_{old}, \quad (12)$$

$$\beta_{new} = \beta_{old} + \delta_{\beta} \times (\ln \beta_{real} - \ln \beta_{comp}) \times \ln bpp_{real}, \quad (13)$$

By using the information from a previously encoded frame to estimate the model parameters to be used for a frame that is to be encoded using a linear model with regard to α and β, the R-λ model inherently assumes that the statistical characteristics of frames change slowly and approximately linearly with regard to time. Furthermore, due to QP clipping, neighboring frames and CUs are usually encoded with very similar QPs. Previous experimental results demonstrated that the λ-domain rate control algorithm is effective for HEVC and can significantly outperform the R-Q model based rate control in HM-8.0, by for example an average of 0.55 dB and up to 1.81 dB for low delay coding. 1.08 dB on average with up to 3.77 dB for random access coding.

An R-lambda model using both hyperbolic function and exponential function may be described as:

$$\lambda = k_1 \alpha R^{\beta} a e^{bR} \quad (14)$$

Where $k_1$ and $k_2$ were calculated by:

$$k_1 = 10 \cdot bpp \quad (15)$$

$$k_2 = 1 - k_1 \quad (16)$$

$k_1$ in (15) will be clipped into [0.0, 1.0] before $k_2$ is calculated according to (16).

The initial values of α and β in the Hyperbolic function may be set to 3.2003 and −1.367. The initial values of a and b in the Exponential function may be decided by:

$$a = 26090 \times e^{-32.9 \times bpp} \quad (17)$$

$$b = -62.37 \times e^{-17.9 \times bpp} \quad (18)$$

After encoding one LCU or one frame, parameters are updated. The values of a and b are update by (19) and (20) below, while α and β may be updated according to (12) and (13) above.

$$a_{new} = a_{old} + \delta_a \cdot (\ln \lambda_{real} - \ln \lambda_{comp}) \cdot a \quad (19)$$

$$b_{new} = b_{new} + \delta_b \cdot (\ln \lambda_{real} - \ln \lambda_{comp}) \cdot \text{bpp} \quad (20)$$

In experiments, $\delta_a$ and $\delta_b$ are set as depicted in Table 1.

TABLE 1

Values of $\delta_a$ and $\delta_b$

| | bpp < 0.02 | 0.02 ≤ bpp < 0.03 | 0.03 ≤ bpp < 0.05 | 0.05 ≤ bpp < 0.08 | 0.08 ≤ bpp < 0.2 | 0.2 ≤ bpp < 0.5 | Others |
|---|---|---|---|---|---|---|---|
| $\delta_a$ | 0.02 | 0.04 | 0.05 | 0.05 | 0.1 | 0.2 | 0.4 |
| $\delta_b$ | 0.3 | 0.3 | 0.2 | 0.1 | 0.1 | 0.1 | 0.1 |

A potential problem with the existing R-λ model based rate control for HEVC is that the underlying assumption that the video characteristics of the frames change slowly and approximately linearly may not be valid for some sequences, such as during scene cuts. For standard video test clips such as Parkrun, the existing R-λ model and update algorithm in the HM-16.0 reference software fails. Even without what can be characterized normally as scene changes, such as those scene changes detected by popular scene-cut detecting algorithms, model failure can also occur when the video content complexity changes more significantly from one frame to the next. As a result, relying on scene-cut detection cannot completely remedy the problem of model failure in R-λ domain rate-control for HEVC.

An improved λ-domain rate control algorithm based on a pre-encoding mechanism may be used to address this problem. The pre-encoding is a fast slice-level encoding process that only checks the 16×16 inter and 16×16 intra modes in the RD mode decision. By utilizing the results of the pre-encoding, on the LCU level (LCU: Largest Coding Unit), the target bitrate is allocated more optimally by assigning a weight to the $i^{th}$ LCU.

$$w_{new}(i) = \frac{R_{16 \times 16}(i)}{\Sigma R_{16 \times 16}(i)}, \quad (21)$$

while scene-cuts are detected when one of the following occur:

$$\begin{cases} D_{pred} < 0.2 D_{last}, \\ D_{pred} > 5 D_{last}, \\ R_{pred} > 5 R_{last}, \\ R_{pred} > 2 R_{avg}, \end{cases} \quad (22)$$

Where $D_{pred}$ and $R_{pred}$ are the distortion and rate found in pre-encoding. $D_{last}$ is the distortion of the last picture, while $R_{target}$ is the target rate of current frame and $R_{avg}$ is the average all previously encoded frames since the last model failure. When model failure is detected, parameters of the proposed R-λ model will be reset to initial values.

After the pre-encoding process including bit reallocation and model update, real encoding process can be performed. After finishing encoding an LCU or a frame, the parameters are updated according to Table 2.

TABLE 2

Values of $\delta_\alpha$ and $\delta_\beta$

| | bpp < 0.03 | 0.03 ≤ bpp < 0.08 | 0.08 ≤ bpp < 0.2 | 0.2 ≤ bpp < 0.5 | Others |
|---|---|---|---|---|---|
| $\delta_\alpha$ | 0.005 | 0.025 | 0.05 | 0.1 | 0.2 |
| $\delta_\beta$ | 0.0025 | 0.0125 | 0.025 | 0.05 | 0.1 |

It is noted that the values of $\delta_\alpha$ and $\delta_\beta$ in Table 2 are different from those above, since they will be updated twice in this rate control algorithm. In this process, the CUs with the size of 16×16 use information such as the reference frames, motion vectors, and mode decision found in the pre-encoding. The transform coefficients may need to be recalculated, quantized and entropy coded After the pre-encoding process including bit reallocation and model update, real encoding process can be performed. After finishing encoding an LCU or a frame, the parameters are updated according to Table 2.

Even though the above approach showed an average 0.1 dB PSNR gain for common single-scene test sequences and up to 4.0 dB PSNR improvement for more complicated sequences such as Parkrun, optimizations are still possible. The formulas for updating α and β may sometimes cause over-estimation. In addition, the LCU-level bit reallocation process may be misled by the incorrectly set α and β when encountering scene-cuts. Furthermore, the scene-cut detection formula may sometimes cause repeated resetting of parameters and bit over-shoot when the initial α and β values underestimate the complexity of subsequently encoded frames.

Delta-QP (DQP) is a way of achieving RD optimized encoding originally proposed for H.264/AVC. DQP adapts the QPs of CUs and frames by trying multiple neighboring QP values in the mode decision and other steps of video coding, and selects the QP that achieves the best RD trade-off among the combinations of the QPs, modes, and other encoder settings. The QP adaptation scheme divides each picture into macroblocks (MB) and adjusts their QPs based on classification using the luminance variance measure. In addition to luminance variance, other metrics such as visual quality smoothness have also been used for DQP optimizations. Previous DQP algorithms aimed at detecting the spatial activity of the current MB and adapt the QP to smoothen the discontinuity between neighboring blocks. DQP algorithms may check QP values for MBs surrounding a center MB QP, and may provide an improvement in the coding efficiency.

The contribution of LCU-level DQP was adopted in the HM software and implemented in a brute-force manner. Two levels of DQP selection were introduced into the standard HEVC compression process, namely the slice-level and the CU-level as each CU can have its own QP in HEVC. For the slice-level DQP, each slice is assigned the center QP and then several neighboring values are tested. When both the slice-level and the CU-level DQP are used, each CTU is encoded using QP values around the current slice-level QP. Therefore each CTU will be checked N×M times, where N and M are the number of QPs to be checked for the slice-level and CU-level respectively. Furthermore, as each CTU can be divided into CUs of different depths, each with its own QP value, a value, named MaxCuDQPDepth, is added to restrict the maximum depth of CU-level DQP so as to prevent the encoding time from growing even more large.

As described further herein, only CTU-level DQP is considered, as simulations show that sub-CU DQP can bring about only 1% BD-rate saving but much higher encoding complexity.

Table 3 below shows the benefit of the DQP algorithm in HM-16.0, achieving up to 9% of BD-rate saving. However, its complexity is also several times higher than normal encoding, and often unacceptable for practical applications. As each CTU makes only a local greedy RD optimization using DQP, sometimes, on the frame level, the local greedy approach results in worse overall RD performance. To accelerate the DQP optimization, an improved DCP optimization approach checks only the {32×32 inter, 32×32 intra, 32×32 merge} modes for slice-level DQP selection. This optimization can reduce the extra coding time to on average 26% without any quality loss. However, it does consider the CU-level DQP, which can provide on average another in 2% BD-rate saving.

Constant quality (CQ) control is another ideal form of rate control targets, aiming at providing a constant quality for improved user experience for applications such as Internet video streaming. The difference between the quality of the last encoded frame and the target quality has previously been used to determine the initial quantization parameter, and the parameter refined using an open-loop approach. To capture the characteristics of the input video, a 2-pass constant quality encoding algorithm has been used in which the first pass used CBR encoding, attempting to capture the temporal complexity variations. The first pass encoding was then used for target bit reallocation in the second, VBR encoding pass. To avoid time-consuming exhaustive searching or high-delay two-pass encoding, a piecewise linear interpolation based R-D model has been used to adjust the target bitrate. An approximate relationship between distortion and quantization has previously been developed based on the linear R-p model and the quadratic R-Q model.

Figure 2:
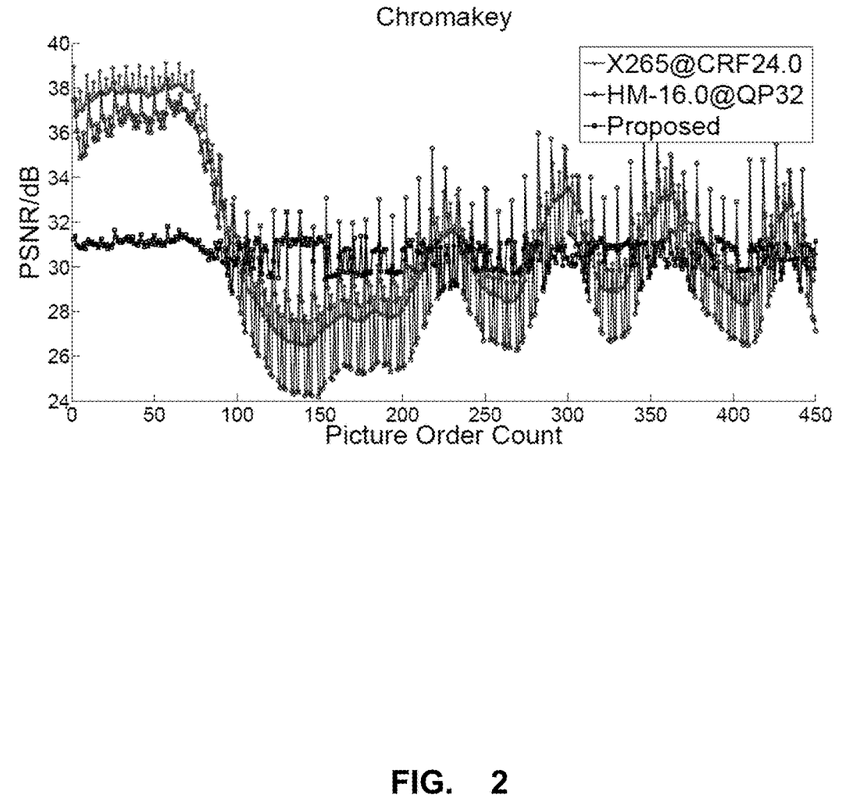
FIG. 2 depicts performance of HEVC encoding using pre-compression for constant quality encoding along with HM-16.0 x265 encoders.

Similar strategies have been integrated into open source HEVC encoders, such as the CQP and CRF modes in x265. In CQP, the QP is constant on the frame level. CRF mode is a quality-oriented strategy introduced to x264 and x265 targeting at uniform quality using information obtained via SATD-based estimation from a down sampled copy of the input video. However, as can be seen in FIG. 2, neither CQP in the HM nor x265 CRF can achieve constant quality.

Existing low-delay single-pass rate control algorithms use models that can be roughly categorized into two classes:

1. Interdependent algorithms that use a feedback loop for parameters refinement and achieve accurate settings at high complexity.

2. Non-interdependent algorithms such as existing R-A model based implementation that predict parameters for frames to be encoded in the future based on past informa-

TABLE 3

Performs of DQP

| Clips | Only Slice-level | | improved DCP o | | Only CU-level | | Both | |
|---|---|---|---|---|---|---|---|---|
| | BD-rate | Enc Time | BD-rate | Enc Time | BD-rate | Enc Time | BD-rate | Enc Time |
| Chromakey | −6.40% | 532% | −6.41% | 125% | −2.70% | 679% | −9.30% | 2276% |
| PartyScene | 1.76% | 516% | 0.12% | 126% | −2.35% | 667% | 0.56% | 2261% |
| RaceHorse | −1.65% | 409% | −1.68% | 126% | −1.10% | 560% | −4.20% | 1789% |
| Wave | −6.60% | 448% | −6.08% | 127% | −1.80% | 520% | −9.00% | 1759% |
| Average | −3.22% | 476% | −3.51% | 126% | −1.99% | 457% | −5.49% | 2021% |

Constant bit rate (CBR) is an important rate control requirement for applications such as DVB delivery. Ideally a CBR algorithm should encode each frame in the sequence to the same size. As this is impossible to achieve, buffers are introduced to decoders to deal with fluctuations in bitrate, so that for every small time window, typically in the order of 1 second, a constant average bitrate can be achieved.

Figure 1A:
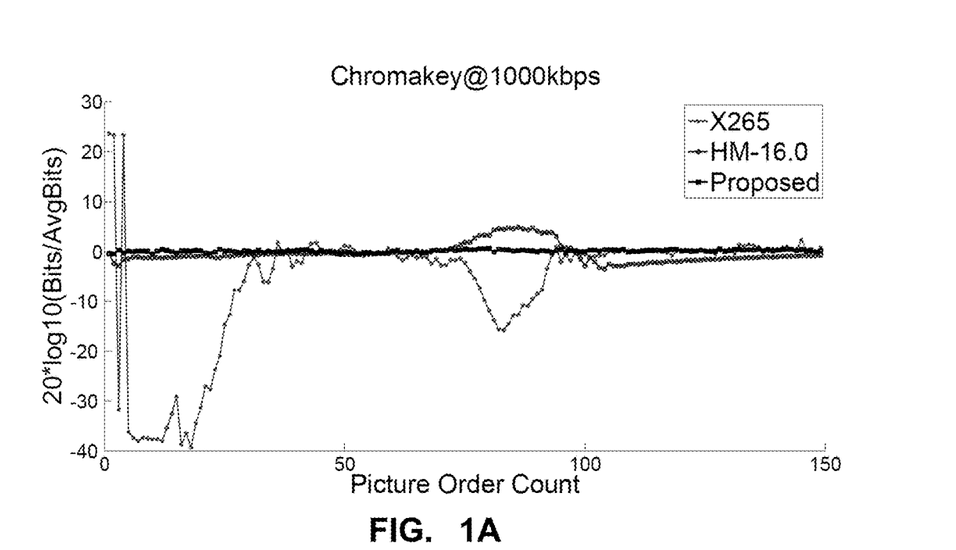
FIGS. 1A and 1B show the bits distribution curves of HM-16.0, x265 and HEVC encoding using pre-compression with acceleration.
Figure 1B:
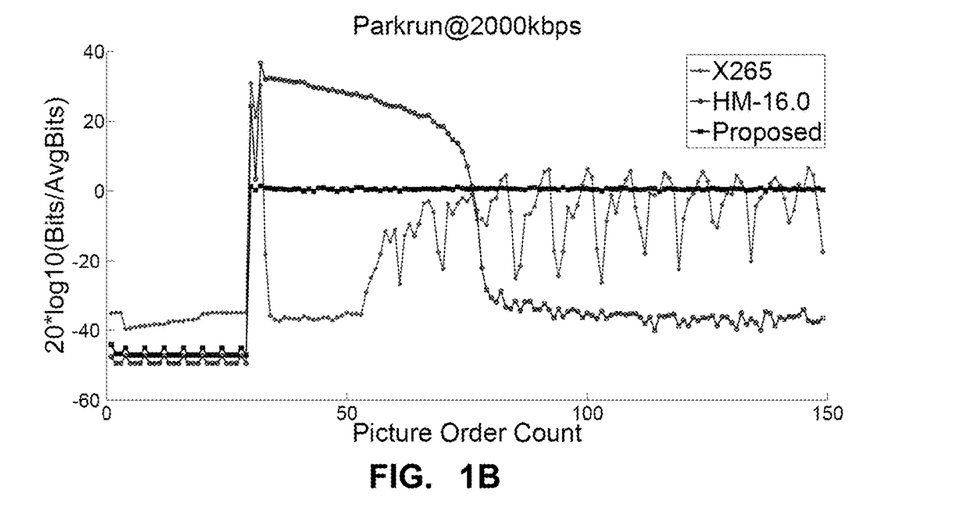

Providing CBR rate control remains a challenge. FIGS. 1A and 1B demonstrate an example of the outputs from the HM-16.0 reference software and the latest version of open source x265 HEVC encoder released on Mar. 14, 2015, as well as a proposed algorithm described further below. Two standard sequences were used, namely Chromakey 720× 480@30 fps and Parkrun 1280×720@50 fps, encoded at 1 Mbps and 2 Mbps respectively in the low delay configuration using only P-slices following a single I-slice. As can be seen from FIGS. 1A and 1B, outputs from the X265 encoder and the HM 16.0 encoder contain significant bitrate fluctuations. In the worst case, a single frame from Parkrun occupied almost 100 times more bits than the average bits.

tion. These algorithms are fast but are not accurate, especially in the presence of scene-cuts.

To overcome the shortcomings of the above two classes of models, pre-encoding or pre-compression may be a highly simplified form of the full-encoding process and may be used to collect the characteristics of the current frame more accurately than non-interdependent models but with much lower complexity and latency than interdependent models. In the pre-encoding, only a severely reduced set of modes are checked. Previous approaches have used {intra 32×32, inter 32×32, merge/skip 32×32} for fast DQP and {intra 16×16, inter 16×16} for scene-cut detection and R-λ model refinement. Table 4 gives the R-square values for the R-λ model obtained using pre-encoding at different partition depths using 4 standard test sequences, Chromakey, PartyScene, RaceHorse and Wave, with QPs in {22, 27, 32, 37}. Here the R-square value is the co-efficient of determination used in statistics for measuring how well bits and distortion data between the pre-encode and full-encode fit a proportional model. It takes on values between 0 and 1, and a value that is closer to 1 indicates better fit.

As shown in Table 4, the larger the PU size, the less encoding time the pre-encoding will consume, while the output from pre-encoding are statistically linearly relevant to the full-encoding.

TABLE 4

Pre-Compression Model Fitting Performance with Different Depths

| Modes | $R^2$ (bits) | $R^2$ (dist) | Pre-Compression |
|---|---|---|---|
| 8 × 8 | 0.988 | 0.983 | 12.20% |
| 16 × 16 | 0.995 | 0.997 | 7.40% |
| 32 × 32 | 0.990 | 0.992 | 6.40% |
| 64 × 64 | 0.969 | 0.979 | 5.80% |

Balancing the accuracy of fitting and encoding speed, the pre-encoding described further herein uses only {intra 32×32 and inter 32×32} for the pre-encoding process, while the linear correspondence between pre-encoding and full-encoding is:

$$R_{full}=0.93 \times R_{pre}, \quad (23)$$

$$D_{full}=0.93 \times D_{pre}. \quad (24)$$

In the encoding described below, the strength of updating for $\alpha$ and $\beta$ is reduced, compared to the strength of updating above, to prevent over-estimation. Table 5 gives the performance of proposed rate control refinement algorithm with different updating strengths compared to the values above. As depicted in Table 5, the halved strength in the 2-stage updating is found to be the best. In the algorithm, the model parameters are updated in two separate steps based on information obtained from previously encoded frames and pre-encoding respectively.

TABLE 5

Performance of Different Updating Strength

| | Updating Strength | | | |
|---|---|---|---|---|
| Clips | 0.25x | 0.50x | 0.75x | 1.00x |
| Chromakey | −0.2 dB | +0.2 dB | +0.0 dB | +0.0 dB |
| PartyScene | +0.0 dB | +0.0 dB | +0.0 dB | +0.0 dB |
| RaceHorse | +0.1 dB | +0.1 dB | +0.0 dB | +0.0 dB |
| Wave | −0.1 dB | +0.1 dB | +0.0 dB | +0.0 dB |
| Average | −0.05 dB | +0.1 dB | +0.0 dB | +0.0 dB |

To prevent "static" scenes, that is scenes that contained little changes from previous frames, from skewing the model, a frame in the parameter updating process is ignored if the distortion after Pre-Compression is below a threshold.

Scene-cut detection may sometimes cause repeated resetting of parameters. This can happen when the initial $\alpha$ and $\beta$ values underestimate the minimal coding complexity of the following frames and cause the rate control to over-shoot the target bitrate for these frames. As a result, $\alpha$ and $\beta$ values will be repeatedly reset. To solve this problem, the scene-cut detecting condition can be simplified and only checks the ratio between target and actual bitrate from pre-encoding. A scene cut may be detected when:

$$R_{pre}>8 \times R_{target} \quad (25)$$

Bit rate undershooting on the other hand, is compensated by gradually apply the unused bitrate to the remaining frames, so as to achieve the target bitrate without fluctuations in the video quality.

As described above, although the DQP mechanism in HM-16.0 is usually useful for coding efficiency improvement, the brute-force implementation is prohibitively expensive. To expedite the process, limited modes of {intra 32×32, inter 32×32, merge/skip 32×32} have been used to determine the best slice-level QP value. Through experiments it was found that the merge and skip can be removed from the set of modes checked with only {intra 32×32, inter 32×32} checked without incurring coding efficiency losses while speeding up the pre-encoding process. To accelerate the 2-level DQP algorithm, the best QPs for each CTU from fast pre-encoding are recorded. After deciding the best slice-level QP value, only the best QP drawn in fast pre-encoding is checked for each CTU instead of extra searching for neighboring values.

For CBR, every frame will be assigned with the same target bits. The initial $\lambda$ value is estimated using the R-$\lambda$ model and adjusted using repeated pre-encoding, also referred to as pre-compression, with updated parameters. To prevent bitrate overshoot, a conservative parameter update strategy may be used in the CBR algorithm. Once $\lambda_{high}$ has been found that causes bitrate over-shoot and the $\lambda_{low}$ that causes bitrate under-shoot, the new $\lambda$ is calculated by:

$$\lambda=\sqrt{\lambda_{low} \times \lambda_{high}} \quad (26)$$

The repeated pre-compression is terminated once the bitrate error is acceptable or no difference is found after $\lambda$ updating. The threshold for bitrate error is set as 5% and a frame that is compressed to less than 5% of the target bitrate is designated as a "static" frame. The algorithm is described in more detail in the pseudo code of Algorithm 1 below.

Algorithm 1 CBR with Pre-Compression

```
 1: Initialize: λ = abppβ
 2: repeat
 3:   Pre-Compression
 4:   Overflow = bitsreal/bitstarget
 5:   dBits = |bitsreal − bitstarget|
 6:   Update {α β}
 7:   if 1 < Overflow < BestOverflow then
 8:     λhigh = λold
 9:     BestOverflow = Overflow
10:   else if 1 > Overflow > BestUnderflow then
11:     λlow = λold
12:     BestUnderflow = Overflow
13:   end if
14:   if {λhigh λlow} available then
15:     λ = (λlow × λhigh)^(1/2)
16:   elseλnew = λold × Overflow
17:   end if
18: until rate err > 5% or dBits > threshold or Overflow! = lastOver flow
19: Full-Compression
```

Figure 3A:
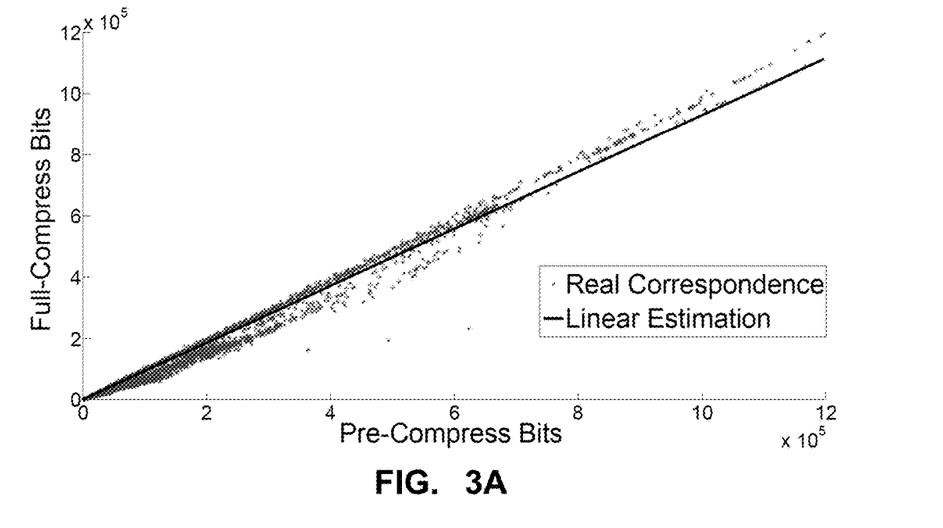
FIG. 3A depicts correspondence between pre-encoding bit rate and full-encoding bit rate.
Figure 3B:
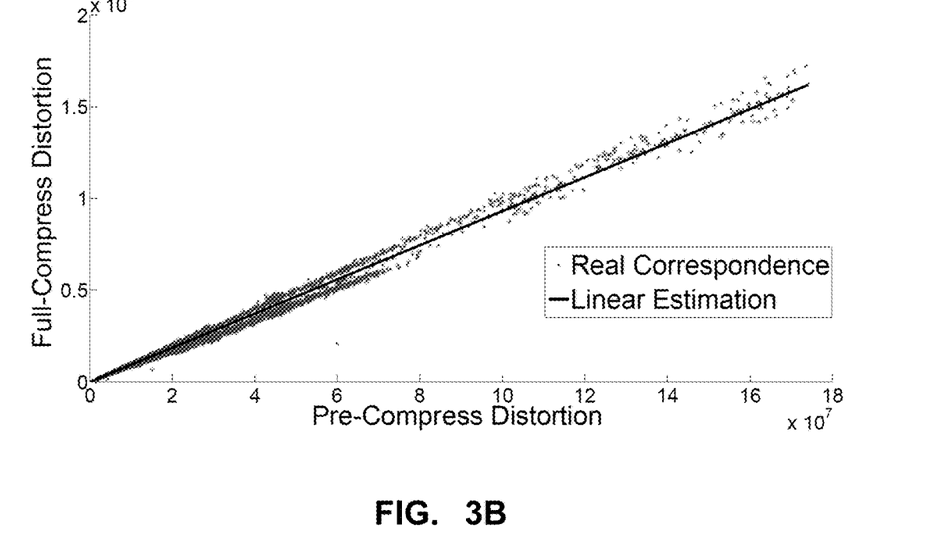
FIG. 3B depicts correspondence between pre-encoding distortion and full-encoding distortion

For CQ, similar to CBR, every frame will be assigned with the same target PSNR in the CQ mode. Due to the strong correlation between the distortions from pre-encoding and full-encoding shown in FIGS. 3A and 3B, the very fast pre-encoding is used to determine the QP for the full-encoding. In the algorithm, the initial QP for the first frame is set using the following formula obtained using experiments:

$$QP=72-1.25 \times PSNR \quad (27)$$

The remaining frames will start with the QP of last frame. After setting the initial QP value, the proposed encoder will enter a loop of pre-encoding, also referred to as pre-compression, with QP adjustments between rounds of pre-compression based on PSNR error. The encoder exit from the loop until the output PSNR after pre-compressing is acceptable or the QP values enter a dead loop of fluctuations. The algorithm can be described using the following pseudo code of Algorithm 2.

---
Algorithm 2 CQ with Pre-Compression
---
1: if Firstframeofcurrentlevel then
2: QP = 72 − 1.25 × Target PSNR
3: else
4: QP = BestQPofLastFrame
5: end if
6: repeat
7: λ = QPFactor × $_2$(QP − 12)/3.0)
8: Pre-Compression
9: PSNR = 10log(MaxV al/(0.93 × Distortion))
10: PSNR Err = round(PSNR − Target PSNR)
11: if |PSNR Err| < Best PSNR Err then
12: Best PSNR Err = Abs(PSNR Err)
13: QPbest = QPold
14: end if
15: QPnew = QPold + Overflow
16: until |PSNR Err| < 0.15 dB or QPnew! = QPbest
17: Full-Compression with QPbest
---

Although pre-compression can be introduced to HEVC to facilitate improved rate control with better accuracy, quality, as well as support for the CBR and CQ modes, it still introduces an extra 6.4% computational complexity on top of the already highly computational expensive HEVC encoding process. To further reduce the computational cost of pre-compression compression, the re-quantization based acceleration as well as information re-using, such as that in fast H.264 to HEVC transcoding, may be incorporated.

The Pre-Compression described herein uses only the inter 32×32 and intra 32×32 modes. The information obtained from previously finished Pre-Compressions such as the reference pictures selecting and motion vectors, can be re-used when the inter 32×32 and intra 32×32 modes are checked during the full encoding, also referred to as full-compression, if the difference between the QPs used for the Pre-Compression and Full-Compression is smaller than a threshold. As statistically a QP change of 3 will roughly double the bitrate for HEVC, the threshold may be set as ±3.

Figure 4:
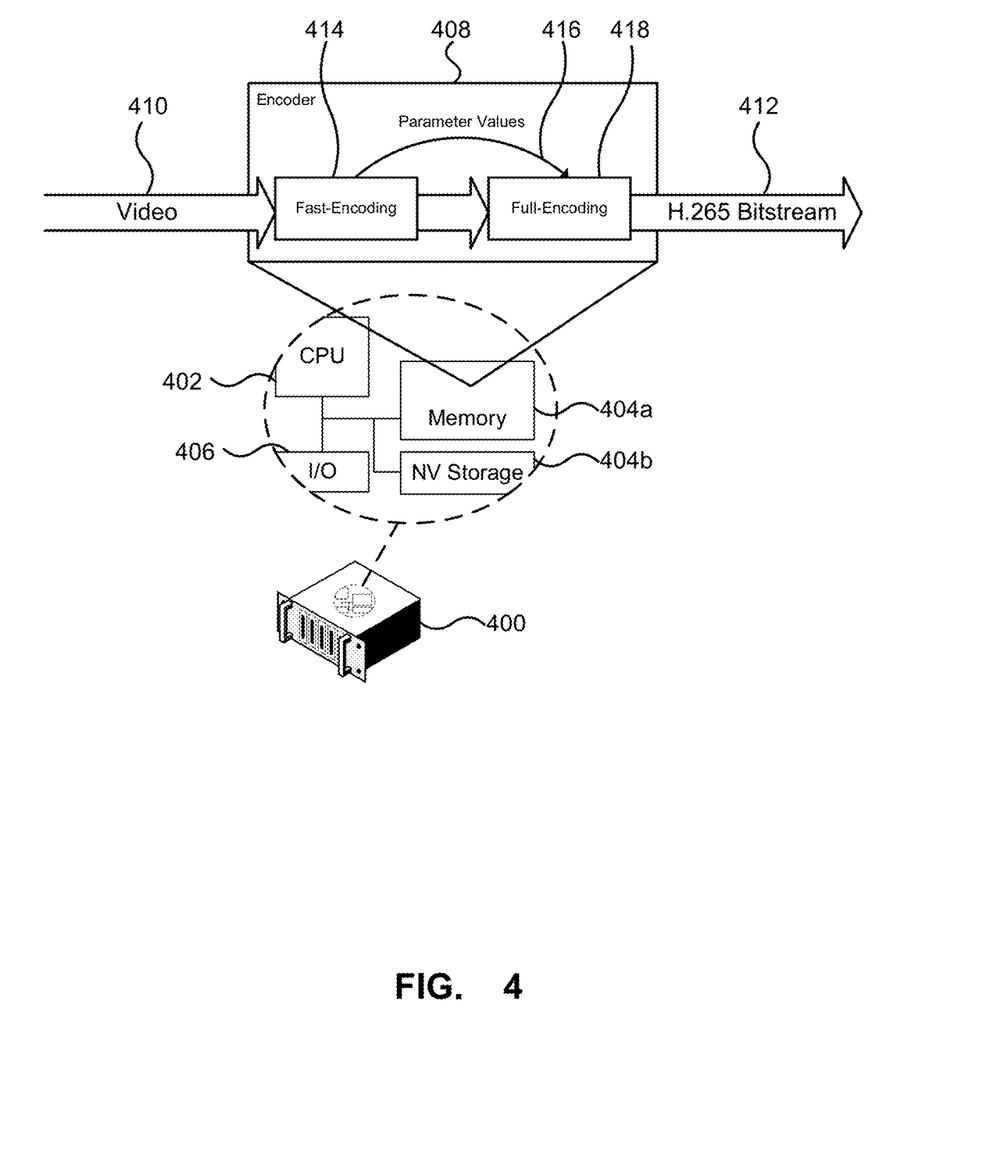
FIG. 4 depicts an HEVC encoder using pre-encoding.

FIG. 4 depicts an encoder for HEVC encoding using pre-encoding. The encoder 200 may be implemented by a processing unit 402 that executes instructions stored in a memory unit, which may include random access memory (RAM) 404a as well as non-volatile memory 404b. The encoder may also include one or more I/O interfaces 406 for coupling additional components to the encoder such as a network interface, keyboard/video/mouse (kvm) etc. The instructions stored in the memory unit 404a, 404b, when executed by the processing unit 402 may provide encoder functionality 408 that receives video data 410 and generates an H.265 bitstream 412. The encoder functionality 408 comprises a fast encoding process 414 that determines encoding parameter values 416, which may then be used in the full encoding process 418 of the encoder functionality 408.

Figure 5:
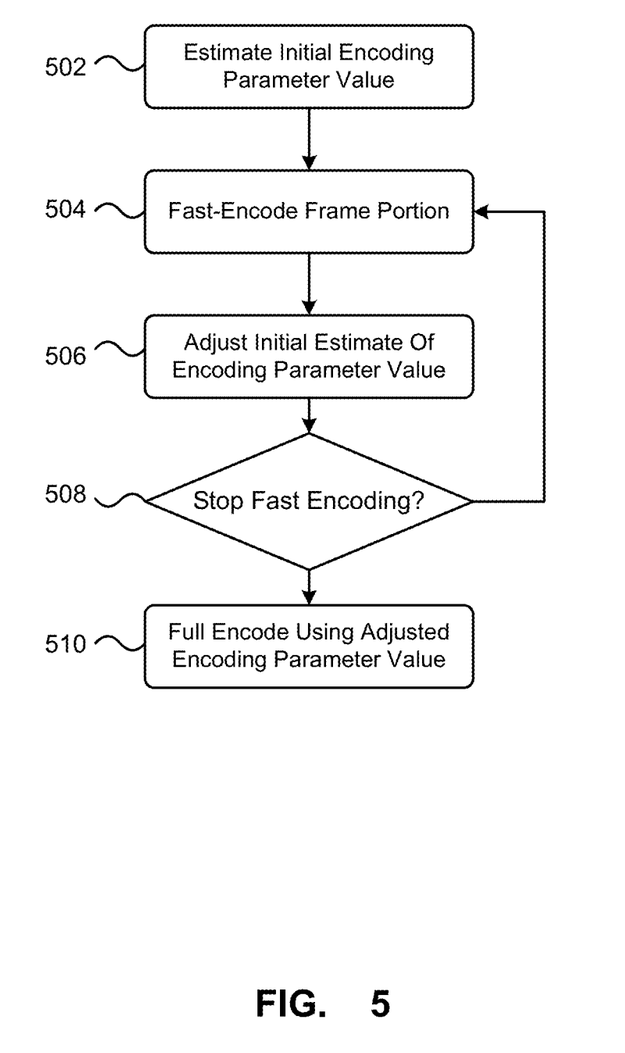
FIG. 5 depicts a method of HEVC encoding using pre-encoding.

FIG. 5 depicts a method for HEVC encoding using pre-encoding. The method 500 estimates an initial encoding parameter value (502). As described above, the initial parameter may be QP or λ. Once the initial parameter value is determined, a fast encoding is performed on the frame (504), or portion of the frame being encoded such as a CU. The fast encoding only considers a subset of the possible encoding modes. In particular, the modes may be the modes for a 32×32 CU. The subset may consist of, for example the inter 32×32 mode and the intra 32×32 mode. Once the frame, or portion thereof, has been encoded according to the reduced subset of possible modes, the initial estimate of the encoding parameter value is adjusted (506) based on the fast encoding results. The method determines whether the fast encoding should be stopped (508). The determination may be based on threshold values, or whether a value, such as the encoding parameter changed from the previous value. If the fast encoding should not be stopped (No at 508), the frame, or portion thereof is again encoded using the fast encoding process (504). If the fast encoding should be stopped (Yes at 508), the frame, or portion thereof, is encoded according to the full encoding process (510), that is with a substantial portion of the encoding modes possibly being evaluated. The full encoding process uses the adjusted encoding parameter value in encoding the frame, or portion of the frame.

The proposed algorithms were implemented in the latest HEVC reference software HM-16.0 with latest x265 on its GitHub repository as a comparison. The experimental platform was Xeon-E2697 CPU@2.6 GHz with 128 GB of RAM running the Linux operating system with gcc 4.6.3. 8 video clips with different resolutions and levels of motion and texture, including both HEVC test sequences were used in testing.

Figure 6A:
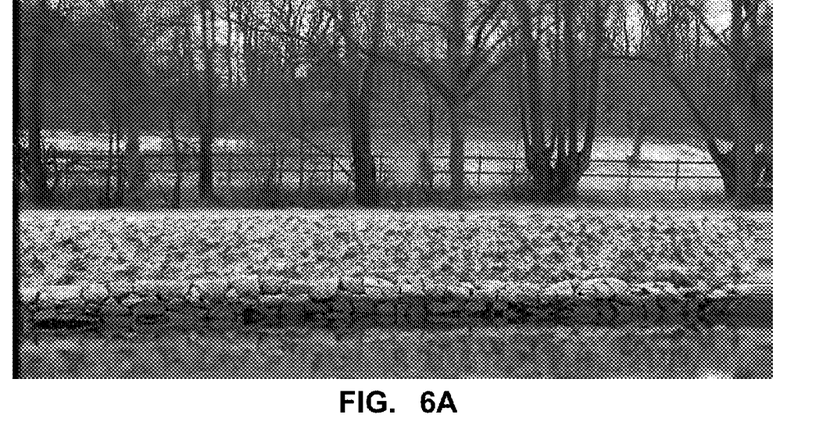
FIG. 6A depicts an encoded frame from Parkrun encoded at 4 Mbps by HM-16.0.
Figure 6B:
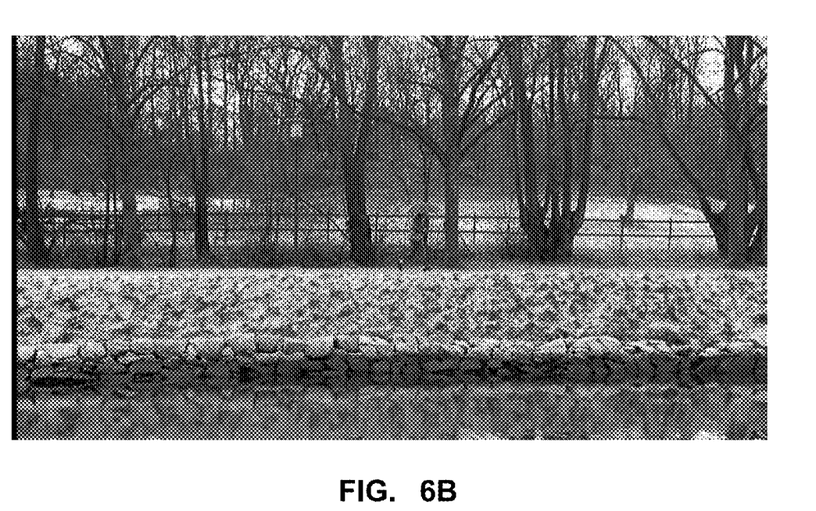
FIG. 6B depicts the encoded frame from FIG. 6A encoded at 4 Mbps using an HEVC encoder using pre-encoding.

To evaluate the performance of the proposed structure, the test clips were encoded into four bitrates {1 Mbps, 2 Mbps, 4 Mbps and 8 Mbps}. The PSNR gain and extra encoding time are the average for four bitrates. As is shown in Table 6, the proposed algorithm could obtain around 0.1 dB PSNR improvement for most of the single-scene test clips with 6.4% higher encoding complexity introduced by Pre-Compression. The proposed acceleration techniques was able to reduce the extra time from 6.4% to an average of about 2.5% total without any quality loss. For Parkrun, overall PSNR gain was about 3.9 dB with subjective quality comparison shown in FIG. 6A and FIG. 6B. FIG. 6A depicts an encoded frame from Parkrun encoded at 4 Mbps by HM-16.0 and FIG. 6B depicts the same frame from Parkrun encoded at 4 Mbps by the proposed pre-encoding HVEC encoder.

TABLE 6

Performance of Proposed HEVC with Pre-Compression

| | Proposed | | Proposed Fast | |
|---|---|---|---|---|
| Clips | PSNR | Time | PSNR | Time |
| Chromakey | +0.2 dB | +7.76% | +0.2 dB | +1.92% |
| Kimono | +0.0 dB | +5.10% | +0.0 dB | +1.51% |
| Parkrun | +3.9 dB | +5.14% | +3.9 dB | +2.37% |
| ParkScene | +0.1 dB | +4.23% | +0.1 dB | +2.08% |
| PartyScene | +0.0 dB | +7.06% | +0.0 dB | +4.44% |
| RaceHorse | +0.1 dB | +7.69% | +0.1 dB | +2.47% |
| Traffic | +0.0 dB | +3.00% | +0.0 dB | +0.23% |
| Wave | +0.1 dB | +11.14% | +0.1 dB | +5.15% |
| Average | +0.5 dB | +6.39% | +0.5 dB | +2.52% |

To assess the performance of the proposed fast Delta-QP algorithm, the test clips were encoded with four QPs {22, 27, 32 and 37} and calculated the BD-rate saving and the extra encoding time. Only low-resolution videos with only slice-level and CTU-level DQP were tested due to the extremely high encoding complexity of the DQP algorithm in HM-16.0. The acceleration techniques were applied in the experiments. From the results in Table 7, the proposed algorithm achieved the same DQP quality improvement but at a much lower encoding complexity, 4.3× faster for slice-level DQP and 7.3× faster for 2-level DQP.

TABLE 7

Performance of Proposed Fast DQP

| | Only Slice-leve | | | | Slice-level & CU-level | | | | |
| | HM | | Proposed | | | HM | | Proposed | | |
| Clips | BD-rate | Time | BD-rate | Time | Speedup | BD-rate | Time | BD-rate | Time | Speedup |
| --- | --- | --- | --- | --- | --- | --- | --- | --- | --- | --- |
| Chromakey | −6.40% | 532% | −6.41% | 110% | 4.84× | −9.30% | 2276% | −9.23% | 262% | 8.69× |
| PartyScene | 1.76% | 516% | +0.12% | 111% | 4.65× | 0.56% | 2261% | +0.12% | 278% | 8.13× |
| RaceHorse | −1.65% | 409% | −1.68% | 108% | 3.79× | −4.20% | 1789% | −4.28% | 269% | 6.65× |
| Wave | −6.60% | 448% | −6.08% | 109% | 4.11× | −9.00% | 1759% | −8.97% | 304% | 5.79× |
| Average | −3.22% | 476% | −3.51% | 110% | 4.35× | −5.49% | 2021% | −5.59% | 278% | 7.31× |

FIGS. 1A and 1B give the bits distribution curves of HM-16.0, x265 and the proposed algorithm with acceleration. The HM-16.0 encounters with a 1-second bits overflow up to 10 dB, while x265 suffers from a radical start-up strategy and saw 20 dB bit underflow. The proposed algorithm is capable of producing the constant bitrate in spite of the encoding complexity fluctuation. FIGS. 1A and 1B depict the bit distribution of the proposed CBR algorithm, with each frame was encoded to around 90% of the target bits as desired. As is shown in Table 8, the proposed algorithm introduces 35% more encoding time compared to the algorithm in the HM-16.0. Owing to the information re-using accelerating strategy, this complexity overhead can be reduced to 18% without any quality loss.

TABLE 8

Encoding Speed of Proposed CBR Algorithm

| | Encoding Time | |
| Clips | Proposed | Proposed Fast |
| --- | --- | --- |
| Chromakey | 125% | 114% |
| Kimono | 145% | 120% |
| Parkrun | 136% | 117% |
| ParkScene | 146% | 124% |
| PartyScene | 131% | 117% |
| RaceHorse | 121% | 111% |
| Traffic | 150% | 129% |
| Wave | 124% | 115% |
| Average | 135% | 118% |

Figure 7:
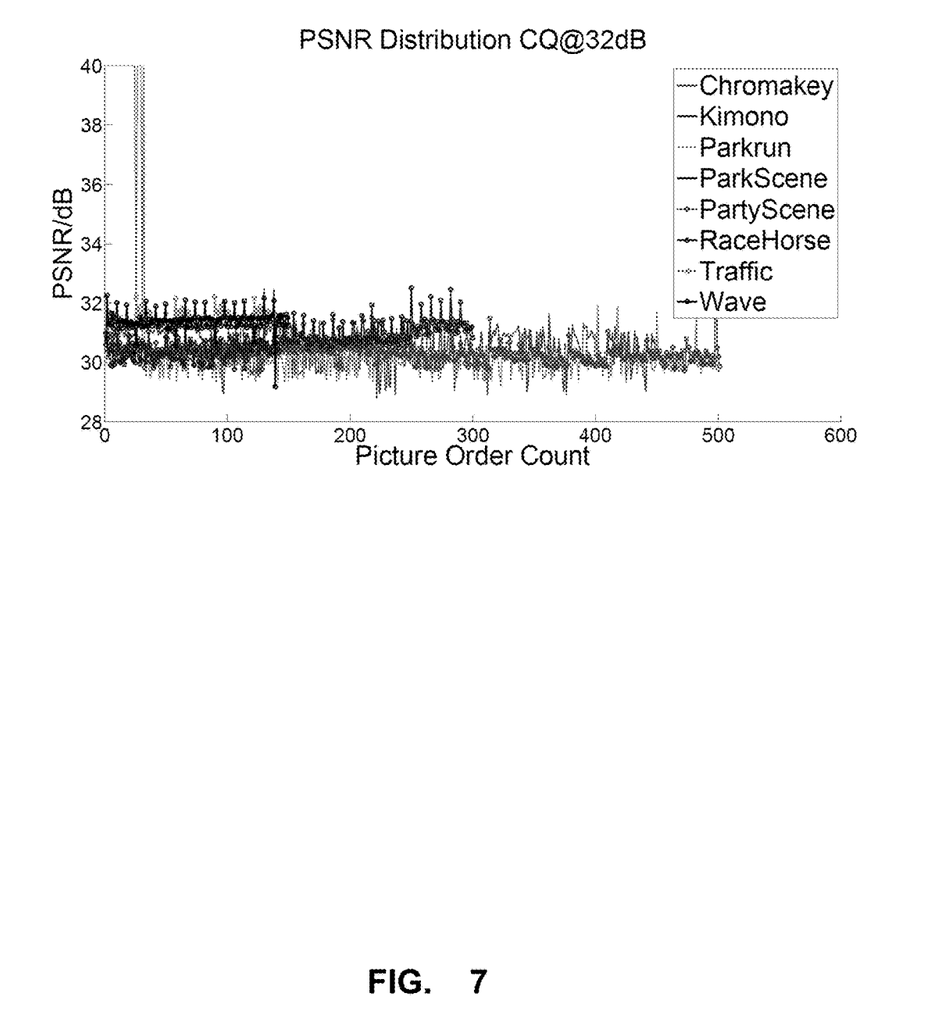
FIG. 7 shows that frames of different videos are all encoded at the similar PSNR value closely around the target PSNR value of 32 dB.

FIG. 2 depicts the PSNR distribution curves of the HM-16.0 CQP mode, the x265 CRF mode and the proposed CQ algorithm with acceleration. In contrast to the HM-16.0 and x265's curves, the proposed algorithm was able to produce a considerably more smooth PSNR curve. FIG. 7 shows that frames of different videos are all encoded at the similar PSNR value closely around the target PSNR value of 32 dB.

It is difficult to calculate the additional encoding complexity for the proposed CQ algorithm due to the lack of a perfectly matching mode producing similar bitrate and PSNR distribution in HM-16.0. Therefore, the experiment uses the results of CQP mode with close output bitrate to evaluate the extra encoding time. Table 9 shows that the proposed algorithm will increase the encoding complexity by about 23% and 14% after proposed acceleration. It should be noted that the HM CQP mode cannot achieve satisfactory CQ.

TABLE 7

Encoding Speed of Proposed CQ Algorithm

| Clips | Proposed | Proposed Fast |
| --- | --- | --- |
| Chromakey | 120% | 112% |
| Kimono | 113% | 108% |
| Parkrun | 150% | 128% |
| ParkScene | 117% | 109% |
| PartyScene | 123% | 114% |
| RaceHorse | 117% | 110% |
| Traffic | 116% | 109% |
| Wave | 129% | 120% |
| Average | 123% | 114% |

An optimized encoding structure of HEVC based on Pre-Compression, also referred to as pre-encoding, is described above. Pre-Compression is a highly simplified form of Full-Compression and can accurately estimate the output bits and distortion of Full-Compression by using a linear model. Compared with other Pre-Compression based algorithms, scene change detection and Pre-Compression are both simplified, and introduces a small amount of extra encoding time that can be further reduced with optimization using information re-using. Experiments show that the proposed encoder was capable of achieving average 0.5 dB and up to 3.9 dB increase in PSNR with only 2.5% higher encoding complexity compared with the HM-16.0 reference software. Pre-Compression can also speedup delta-QP algorithm by 4.3× and 7.8× for slice-level and 2-levels DQP without any quality loss. Based on the Pre-Compression, the proposed encoder can produce the accurate target bitrate with a small loop of parameters refinement. CBR and CQ are well supported by the proposed structure at the cost of slightly higher coding complexity.

The above has described the use of pre-compression or pre-encoding in order to improve HEVC encoding. The approach described above may further be refined as described below.

The co-inventors of the present invention have further described aspects of the present invention in a white paper entitled "A Delay-based Low-complexity HEVC Encoding Algorithm with Pre-Compression", a copy of which is attached hereto as Appendix A and expressly incorporated herein in its entirety by reference, and thus forming part of the present specification.

A low-delay encoding framework uses a delay-based low-complexity Pre-Compression structure in the standard HEVC encoding. Pre-Compression is a highly simplified form of Full-Compression and can accurately estimate the output of Full-Compression at a relatively small cost, of only for example 3%, increase in overall encoding complexity for HEVC test model (HM) and x265. The information collected from Pre-Compression can be used to improve rate control process for accurate parameter settings and optimal target bits allocation. Two kinds of rate control refinement are described further below, namely a zero-latency and delay-based approaches. For multi-scene videos like movie fragments, experiments using the proposed zero-latency algorithm show an improvement on average 37% and 7% saving in BD-rate for HM and x265 respectively as a result of the improved rate control algorithm and scene-cut detection. By introducing some delay between the Pre-Compression and the Full-Compression, the encoder can look ahead into future frames and achieve better target bitrate allocation and achieve 13.5% saving in bitrate without compromising quality. In addition to the rate control, the Pre-Compression process is capable of expediting the extra encoding time of delta-QP (DQP) algorithm in the HM-16.0 by a factor of 50× on average without any quality loss. CBR and CQ modes are also well supported by Pre-Compression at a cost of 8% extra encoding time.

The Pre-Compression process described herein also makes it easier to support precise CBR and CQ modes of rate control and expedite the time consuming delta-QP (DQP) algorithm by a factor of 50× on average without quality loss.

Pre-Compression, which is a highly simplified HEVC encoding, is introduced into the encoding process to capture the characteristics of the current frame and help achieve better parameters than the 1-pass R-λ model based rate control algorithms without incurring high delay or computational complexity. The Pre-Compression may use a severely limited set of modes of only Inter 2N×2N and Intra 2N×2N at a single coding depth. The Pre-Compression can capture the rate and distortion characteristics of a video frame efficiently. Since the output of Pre-Compression is closely correlated to Full-Compression in both bitrate and distortion, information collected from Pre-Compression can be used to improve rate control process in three aspects namely, accurate settings of coding parameters, target bits reallocation (frame-level and CTU level) for improved quality, and coding complexity based scene changes detection. According to the influence on delay, the algorithms can also be divided into two parts, zero latency refinement (accurate parameters setting, CTU-level bitrate reallocation and scene change detection) and delay based refinement (frame-level bitrate reallocation).

In the first step of the proposed algorithm, {α,β} of R-λ model will be updated similar to the LMS method after Pre-Compression. With the new step size, which determines the granularity of parameters adjustment, the parameters can be refined accurately and the overshoot problem can be addressed. The maximum adjustment in parameter updating is limited to avoid dramatic video quality fluctuations In the second step of the algorithm, the target bitrate for frames and CTUs is re-allocated based on the results of Pre-Compression. The distribution of bits over CTUs from Pre-Compression has been used as the weight for each CTU in the bits reallocation for the Full Compression. Since each CTU uses different α and β values, which have been already adapted based on the video content, and might be assigned with different initial QP values, the reallocation may sometimes increase the QP difference among CTUs and lead to noticeable quality variations inside the same frame. In the zero-latency refinement, the QP values for CTUs in the Pre-Compression are unified to reallocate the CTU-level target bits. A delayed Pre-Compression based look ahead process for bitrate reallocation may be used to achieve high coding efficiency while minimizing noticeable quality variations between CTUs. The output bits of Pre-Compression can be divided into two parts, the bits used to coding and therefore reflect the complexity of the residuals (CR) and the bits used to coding and therefore reflect the complexity of the syntax (CS). The complexity of the residuals mainly depends on the energy of the quantization errors, while the complexity of the syntax, including the bits used for the slice header and for coding the partition modes as well as referencing information, will remain roughly unchanged when the QP value changes in a small range, until the QP difference becomes large enough to "justify" a different coding mode, partition and motion estimation setting. Supposing that the delay between Pre-Compression and Full-Compression is K frames and the number of the target bits for the next K+1 frames is N, the output bits using q as the Q value for the next K+1 frames can be estimated by the following formula, $$\text{Bits}(q) = \sum_{i=0}^{K} \left( \frac{Q_i}{q} CR_i + CS_i \right) \quad (28)$$

$$q_{opt} = \text{argmin}_q \left| N - \sum_{i=0}^{K} \left( \frac{Q_i}{q} CR_i + CS_i \right) \right| \quad (29)$$

where the $Q_i$ value is the Q value used for the next $i_{th}$ frame in the Pre-Compression.

In the third step of the algorithm, a difference between the actual and the target bit rates is used to identify the scene changes to avoid using improper rate control model parameters. A scene change may be recognized if the number of output bits turns out to be far away from the goal using the following simplified condition, $$R\text{pre} < R\text{target}/5 \text{ or } R\text{pre} > 5R\text{target} \quad (30)$$

Experiments showed that the above simplified condition is more robust for scene change detection. Previous scene change detection process may sometimes cause repeated resetting of parameters when the initial α and β values underestimate the coding complexity of the following frames. As a result, bitrate will overshoot every time with initial parameters and α and β values will be repeatedly reset. To solve this problem, two pairs of α and are added to represent the R-λ relationship for "lowest"-complexity videos and "highest"-complexity videos respectively. These two groups of parameters may be trained in the encoding process of, for example surveillance videos in class E and the high-complexity videos such as Parkjoy and Ducks. When a scene change is detected, among the initial parameters, the parameters producing the smallest bitrate error will be chosen for the Full-Compression.

Although the DQP mechanism in HM-16.0 is usually effective for improving video coding efficiency, the original brute force search based implementation in the HM is computationally prohibitively expensive. A fast DQP algorithm uses a severely limited set of modes of Inter 2N×2N and Intra 2N×2N to expedite the Pre-Compression process. Assuming the maximum slice-level DQP offset is 3 and the center QP value is 30, the original HM implementation needed to examine seven different QPs between 27 and 33 in a brute-force manner. This process can be greatly simplified with a simple steepest decent approach, i.e. QP=32 will only be checked if and only if the RD cost for QP=31 is lower than for QP=30. Similarly QP=27 will only be checked if and only if Cost(28)<Cost(29)<Cost(30). Experimental results show that, other than the three QPs in the middle of the search range ({29, 30, 31} in this case), on average only 2.3 of the remaining four QPs need to be checked, while statistically there is a 99.92% chance the steepest decent algorithm will select the same QP as the brute-force search.

With regard to the CU-level DQP algorithm, the sub-CU DQP is disabled since it is computational-expensive but only brings about negligible BD-rate saving. The DQP algorithm can divided into two parts, the best QP decision for each CTU and the Full-Compression with best QPs already determined, with the steepest decent algorithm also used for optimal QP selection. Assuming the maximum slice-level DQP offset and CU-level DQP offset are 3, each CTU needs to be compressed 7×7=49 times using the brute force method and statistically the number can be reduced to 25 by applying the steepest decent algorithm. As a CTU may be encoded multiple times in a brute-force search based 2-level DQP implementation, re-using information obtained from the Pre-Compression, such as the reference picture selection and motion vectors, can reduce the overhead of the redundant motion estimation processes and accelerate the DQP algorithm.

In theory, an encoding running a CBR rate control algorithm should encode every frame to the same compressed size. As this is hardly possible to achieve, a buffer is usually introduced so that for a small window of frames, the total encoded size is constant. Given the buffer size, for each frame in the sliding window, the current frame will be allocated with the maximum number of bits it can occupy. The minimum target bits are also introduced to make full use of the bandwidth, which are set 90% as many as the maximum target bits.

After the target number of bits is specified for each frame, the initial $\lambda$ value ($\lambda_0$) can be calculated by using the R-$\lambda$ model and later adjusted according to the results of Pre-Compression. The relationship between R and Q can be modeled as equation (5) above, with the initial values of $\{a, b\}$ in HM-8.0 set as $\{4.9371, 0.0922\}$ for high quantization and $\{16.7429, -1.1494\}$ for low quantization. The absolute value of b will maintain much smaller than a during the encoding process, since the step size for a, which determines the granularity of the adjustment, is 200 times and 9.5 times greater than the step size for b when the quantization is high and low respectively. As typical values of Q are generally large, e.g. 4.8 when QP=27 and 9.6 when QP=33, the term $bQ^{-2}$ is usually negligible as compared to $aQ^{-1}$ and the model becomes $R=aQ^{-1}$. Then linearly adjusting the $Q^{-1}$ value based on the distance between the actual and target bitrates can help achieve a more accurate parameter $\lambda_i$. However, this simplified model will usually result in overshooting the target because of eliminating the term $bQ^{-2}$. The linear model indicates that doubling the Q value will cause 50% reduction in bitrate, while experiments show that the typical reduction is closer to 40% rather than 50%. So the Pre-Compression should be conducted again using $\lambda_i$ for a second refinement. After that, the $\lambda$ used for the Full-Compression can be estimated by the weighted geometric average of $\lambda_0$ and $\lambda_1$, since log($\lambda$) obeys a linear relation with the log(bpp) as is described in equation (9). During the CBR algorithm, the encoder will exit from refinement process once the output bitrate is acceptable. Besides, if the number of output bits is less than a specified threshold (TH), which will barely influence the rate control process, the current frame will be considered static and the encoder will exit from the refinement as well. This threshold is set as 0.005 bits per pixel, which equals to the average output bitrate of the low-complexity videos in class E when they are compressed using QP=40. The whole CBR method is described in more details in the pseudo code below.

---

Algorithm 3 CBR with Pre-Compression

---

1: defAccepted (bitsmin < bitsout < bitsmax or bitsout < TH)
2: $\lambda 0 = abpp^\beta$
3: QP0 = $\lfloor 4.2005 \log\lambda 0 + 13.7122 + 0.5 \rfloor$
4: Q0 = $0.85 \times 2^{(QP0-12)/6}$
5: Pre-Compression(QP0, $\lambda 0$)
6: Overflow$_0$ = bitsout/bitstarget
7: if Accepted then
8: QP = QP0; $\lambda = \lambda 0$
9: goto END
10: end if
11: Q1 = Q0 × Overflow$_0$
12: Calculate QP1, $\lambda 1$
13: Pre-Compression(QP1, $\lambda 1$)
14: Overflow1 = bitsout/bitstarget
15: if Accepted then
16: QP = QP1; $\lambda = \lambda 0$
17: goto END
18: end if
19: $\lambda = \exp[((\ln\lambda 0 + 1 - \text{Overflow}_0)/(\text{Overflow}_1 - \text{Overflow}_0)) \times \ln(\lambda 1/\lambda 0)]$
20: QP = $\lfloor 4.2005 \log\lambda + 13.7122 + 0.5 \rfloor$
21: END : Full-Compression(QP, $\lambda$)

---

Similar to the CBR, every frame will be assigned with the same target PSNR value in the CQ mode. The quantization process in HEVC can be summarized as follows, $$Cout = (CinQuant[QP \% 6] + Offset) >> QBits, \quad (31)$$

$$Quant = [26214, 23302, 20560, 18396, 16384, 14565], \quad (32)$$

$$QBits = 14 + QP/6 + (7 - \log(TUSize)). \quad (33)$$

where the $C_{in}$ and $C_{out}$ are the coefficients before and after the quantization. The quantization coefficient will reduce by half for every decrease of 6 in the QP value. In turn, the quantizing noise will also be halved. As the discrete cosine transform (DCT) in HEVC is an orthonormal transform, the sum of squared error (SSE) distortion is identical in both the spatial and transform domains. PSNR after reconstruction for 8-bit video defined as $$PSNR = 10 \log 10(255^2/MSE), \quad (34)$$

where MSE is the mean squared error in the spatial domain, can be approximated using a noisy linear model $$QP = a \times PSNR + b + n, \quad (35)$$

where a and b are constants, and n is a zero mean random noise related to the specific content. Regression run using the complete set of 24 HEVC standard test sequences, gives the following approximation, $$QP = -1.84 \times PSNR + 98.3 \quad (36)$$

The formula is used to generate the initial QP value for the first frame, while the remaining frames will start with the QP value of the previous frame in encoding order. The proposed CQ rate control algorithm is a two-step scheme as described in Algorithm 3 above. The initial QP value for a frame is denoted as QP$_0$. According to the distance between the actual and target PSNRs, the QP value can be adjusted using QP$_1$=QP$_0$+2round(PSNR$_{out}$-PSNR$_{target}$). Compared with equation (36), the equation used for the adjustment will result in an overshoot and make it easy to achieve an accurate QP value by squeezing. After the second time of Pre-Compression using QP$_1$ is finished, the weighted average of two QPs used in the previous Pre-Compressions, QP$_0$ and QP$_1$, will be used in the Full-Compression. The algorithm exits from the refinement once the output PSNR value is acceptable, and the condition for acceptance can be specified by users with the default value of ±1 used in the experiments.

---
Algorithm 4 CQ with Pre-Compression
---
1: defAccepted |ΔPSNR| < 1
2: if FirstFrame then
3: QP0 = −1.84 × PSNRtarget + 98.3
4: else
5: QP0 = QPlast
6: end if
7: Pre-Compression(QP0)
8: Δ0 = PSNRout − PSNRtarget
9: if Accepted then
10: QP = QP0
11: goto END
12: end if
13: QP1 = QP0 + 2round(2ΔPSNR)
14: Pre-Compression(QP1)
15: Δ1 = PSNRout − PSNRtarget
16: if Accepted then
17: QP = QP1
18: goto END
19: end if
20: QP = round(QP0 − [Δ0/(Δ1 − Δ0) × (QP1 − QP0))
21: END : Full-Compression(QP)
---

The present disclosure provided, for the purposes of explanation, numerous specific embodiments, implementations, examples and details in order to provide a thorough understanding of the invention. It is apparent, however, that the embodiments may be practiced without all of the specific details or with an equivalent arrangement. In other instances, some well-known structures and devices are shown in block diagram form, or omitted, in order to avoid unnecessarily obscuring the embodiments of the invention. Further, while various illustrative specific values for parameters are given, it will be apparent to one of ordinary skill in the art that these values may be varied. The description should in no way be limited to the illustrative implementations, drawings, and techniques illustrated, including the exemplary designs and implementations illustrated and described herein, but may be modified within the scope of the appended claims along with their full scope of equivalents.

While several embodiments have been provided in the present disclosure, it should be understood that the disclosed systems and components might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

What is claimed is:

1. An encoder for HEVC encoding comprising:
a. a processing unit for executing instructions; and
b. a memory unit for storing instructions, which when executed by the processing unit configure the encoder to:
   i. estimate an initial encoding parameter value for at least a portion of a frame being encoded, the initial encoding parameter value being one of λ and quantization parameter (QP);
   ii. adjust the initial encoding parameter value by fast-encoding the portion of the frame using a reduced subset of possible encoding modes; and
   iii. encode the portion of the frame using the adjusted encoding parameter value and a larger set of possible encoding modes then in the reduced subset;
wherein the HEVC encoding is a constant bit rate (CBR) HEVC encoding, and wherein the initial encoding parameter is λ and is estimated using an R-λ model and is adjusted based on repeated fast-encodings according to:

$$\lambda = \sqrt{\lambda_{low} \times \lambda_{high}},$$

where:
$\lambda_{low}$ is a λ value determined from the fast-encodings that causes a bitrate under-shoot; and
$\lambda_{high}$ is a λ value determined from the fast-encodings that causes a bitrate over-shoot.

2. The encoder of claim 1, wherein the reduced subset of possible encoding modes use a coding unit (CU) size of 32×32 or 16×16.

3. The encoder of claim 2, wherein the reduced subset of possible encoding modes use the CU size of 32×32.

4. The encoder of claim 1, wherein the fast-encoding is associated with a rate value ($R_{pre}$) and a distortion value ($D_{pre}$), where the encoding is associated with a rate value ($R_{full}$) and a distortion value of ($D_{full}$) with:
a. $R_{full} = k_R R_{pre}$; and
b. $D_{full} = k_D D_{pre}$,
c. $k_R$ and $k_D$ are respective constants.

5. The encoder of claim 4, wherein
a. $k_R = 0.93$; and
b. $k_D = 0.93$.

6. The encoder of claim 1, wherein the fast-encodings determine the λ value according to:
a. $\lambda = k_1 \alpha R^\beta + k_2 a e^{bR}$,
b. where:
c. $k_1 = 10 \times$ bits per pixel (bpp); and
d. $k_2 = 1 - (k_1$ clipped to [0.0, 1.0]).

7. The encoder of claim 1, wherein the HEVC encoding is a delta-QP (DQP) HEVC encoding.

8. The encoder of claim 7, wherein the initial encoding parameter is QP, and the fast-encoding uses only 32×32 modes or only 16×16 modes.

9. The encoder of claim 1, wherein the HEVC encoding is a constant quality (QP) HEVC encoding.

10. The encoder of claim 9, wherein the initial encoding parameter is QP, wherein the initial QP value is adjusted by repeated fast-encodings based on a peak signal to noise ratio (PSNR) error.

11. The encoder of claim 1, wherein the fast-encoding is used to determine a rate value ($R_{pre}$), and the instructions, when executed by the processing unit further configure the encoder to:
a detect a scene cut when:
b. $R_{pre} > C \times R_{target}$,
c. where:
d. C is a constant; and
e. $R_{target}$ is a target bit rate for the fast encoding.

12. The encoder of claim 11, wherein C is selected to be between 5 and 8.

13. The encoder of claim 1, wherein the results of the fast encoding are used in the encoding when the coding unit (CU) sizes of the fast encoding and the encoding match.

14. The encoder of claim 1, wherein the portion of the frame being encoded is a largest coding unit (LCU) of the frame.

15. A method for HEVC encoding comprising:
a. estimating an initial encoding parameter value for at least a portion of a frame being encoded, the initial encoding parameter value being one of λ and quantization parameter (QP);
b. adjusting the initial encoding parameter value by fast-encoding the portion of the frame using a reduced subset of possible encoding modes; and
c. encoding the portion of the frame using the adjusted encoding parameter value and a larger set of possible encoding modes then in the reduced subset;
wherein the HEVC encoding is a constant bit rate (CBR) HEVC encoding, and wherein the initial encoding parameter is λ and is estimated using an R-λ model and is adjusted based on repeated fast-encodings according to:

$$\lambda = \sqrt{\lambda_{low} \times \lambda_{high}},$$

where:
$\lambda_{low}$ is a λ value determined from the fast-encodings that causes a bitrate under-shoot, and
$\lambda_{high}$ is a λ value determined from the fast-encodings that causes a bitrate over-shoot.

16. The method of claim 15, wherein the reduced subset of possible encoding modes use the CU size of 32×32.

17. The method of claim 15, wherein the portion of the frame being encoded is a largest coding unit (LCU) of the frame.

* * * * *